United States Patent
Watari et al.

(10) Patent No.: US 7,363,524 B2
(45) Date of Patent: Apr. 22, 2008

(54) SYSTEM FOR EXECUTING PRESCRIBED PROCESS DURING OPERATING SYSTEM IS IN SLEEP STATE USING INFORMATION STORED IN COMMON AREA

(75) Inventors: Masakazu Watari, Kawasaki (JP); Itaru Hiraki, Kawasaki (JP); Yuji Yamaji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 10/338,668

(22) Filed: Jan. 9, 2003

(65) Prior Publication Data
US 2003/0208701 A1 Nov. 6, 2003

(30) Foreign Application Priority Data
May 1, 2002 (JP) .............................. 2002-130002

(51) Int. Cl.
*G06F 1/32* (2006.01)
(52) U.S. Cl. .......................................... 713/323; 713/2
(58) Field of Classification Search ............... 713/323, 713/1
See application file for complete search history.

(56) References Cited

U.S. PATENT DOCUMENTS 5,802,305 A 9/1998 McKaughan et al.
6,006,285 A * 12/1999 Jacobs et al. ................ 710/14
6,367,074 B1 * 4/2002 Bates et al. ................ 711/170
6,631,469 B1 * 10/2003 Silvester ........................ 713/2

FOREIGN PATENT DOCUMENTS

| EP | 0 810 510 A1 | 3/1997 |
| EP | 0 945 778 A2 | 9/1999 |
| JP | 06-282362 | 10/1994 |
| JP | 9-101848 | 4/1997 |
| JP | 10-31571 | 2/1998 |
| JP | 11-126173 | 5/1999 |
| JP | 2000-099335 | 4/2000 |
| JP | 2001-236237 | 8/2001 |
| WO | 01/39164 A1 | 5/2001 |

OTHER PUBLICATIONS

European Search Report for application No. 02259012.9-2224; dated Jan. 26, 2006 (3 pgs).

* cited by examiner

*Primary Examiner*—Thuan Du
(74) *Attorney, Agent, or Firm*—Staas & Halsey LLP

(57) ABSTRACT

The present invention relates to an information processing apparatus such as a personal computer and an information processing program that is executed there, and the process is immediately executed while the power consumption is suppressed. A program that is operable even when the operating system is in its state of sleep is prepared. By supplying a power source to only the necessary components, a prescribed process is executed with that program while the operating system is kept in its state of sleep.

20 Claims, 15 Drawing Sheets

SYSTEM FOR EXECUTING PRESCRIBED PROCESS DURING OPERATING SYSTEM IS IN SLEEP STATE USING INFORMATION STORED IN COMMON AREA

BACKGROUND OF THE INVENTION

1. Field of the Invention

The present invention relates to an information processing apparatus such as a personal computer and an information processing program storage medium storing therein an information processing program that is executed within that information processing apparatus.

2. Description of the Prior Art

In an information processing apparatus such as a personal computer (hereinafter sometimes referred to, for example, as "the PC"), there are usually installed a number of application programs, and, in addition thereto, an operating system (OS). The OS is basic software that makes it possible to conveniently use the ability of the computer. It for example determines the interface between the PC or the like and the application programs, determines the schedule for using the resources the PC possesses and allots them, makes the input/output processing easy, executes error processing or the like.

This PC or the like has a state of sleep in which there is stopped the supply of the power to the parts other than a very small number of parts always needed to have the power turned on; and the OS installed thereon is in sleep, and an ordinary state of operation in which power is supplied to all the respective parts of the PC or the like and the OS therein is in operation. To operate the application programs in the PC or the like, it is necessary that that PC or the like be in the ordinary state of operation and thereby the OS therein be in the state of operation.

For this reason, in a case where the PC or the like is in its state of sleep, when attempting to perform some processing by the use of that PC or the like, it is necessary to once change the state of the PC or the like into the ordinary state of operation and then execute that processing. However, there is the problem that changing the PC or the like from the state of sleep to the ordinary state of operation (to start the PC) requires the use of a rather large amount of time that is as large as, for example, several minutes or around ten minutes and that, therefore, it is impossible to immediately use the PC or the like kept in the state of sleep. To avoid this problem, it is also considered available to adopt the measure to keep the PC or the like in the ordinary state of operation (to leave the PC or the like started up). However, in that case, it results that the state where power is being supplied to the respective parts of the PC or the like is maintained as is. This uselessly consumes the power and, especially in a case where power is being supplied from the batteries, causes the problem unable to make long use of the batteries.

SUMMARY OF THE INVENTION

It is therefore an object of the present invention to provide an information processing apparatus having installed therein an OS and having a state of sleep and an ordinary state of operation, which can immediately execute a process after having suppressed the power consumption, and an information processing program storage medium having stored therein an information processing program which is executed within the information processing apparatus and causes this information processing apparatus to operate as the one that can immediately execute the process after having suppressed the power consumption.

To achieve the above object, according to the present invention, there is provided an information processing apparatus being adapted to have operated therein an operating system having an ordinary state of operation and a state of sleep comprising: a memory that is used when the operating system is in the ordinary state of operation; and an information processing section that, when the operating system is in the state of sleep, executes a prescribed process by using information that is stored in the memory when the operating system is in the ordinary state of operation.

Also, according to the present invention achieving the above object, there is provided an information processing program storage medium being arranged to have stored therein an information processing program that is executed in an information processing apparatus having operated therein an operating system having an ordinary state of operation and a state of sleep and being equipped with a memory that, when the operating system is in the ordinary state of operation, is used; and the information processing program, when the operating system is in the state of sleep, causes the information processing apparatus to execute a prescribed process by using information that is stored in the memory when the operating system is in the ordinary state of operation Ordinarily, in an information processing apparatus such as a microcomputer, there is installed a software called "BIOS" (Basic Input/Output System) which is a fundamental software for the information processing apparatus that controls transmission/reception of information between it and the input/output device. This BIOS ordinarily is stored in a ROM or flash memory. It acts to operate when the power is turned on, and to start up the operating system (OS) stored in the hard disk or the like to thereby boot the information processing apparatus into its ordinary state of operation.

Also, in recent years, there has been proposed FirstWare (the trademark of Phoenix Technologies Ltd.) that operates on this BIOS (refer to http://WWW.phoenix.com/PlatSS/pcplatforms/common/FirstWare. html).

This FirstWare is the software which is as follows. It happens that a personal computer will come into a so-called state of freeze, for example, wherein the OS operating on the personal computer does not normally operate. When the OS has come into a state of freeze, also, the BIOS can operate independently from the OS. Therefore, even at such a time, the FirstWare is started up on the BIOS and functions to back up, for example, the data of the hard disk.

The present invention has been made by getting an idea from the above-described existence of the BIOS for booting the OS, the FirstWare or the like operating on it and this idea is, even in a state where the OS is in sleep, to, for example, perform display of a schedule or the like, reproduction of information such as a musical piece, and communication of an e-mail or the like.

In the present invention, typically, with the devices having a movable section such as the hard disk being kept out of operation and with information being kept stored in part of the memory, power is supplied to the necessary components only, to thereby display or reproduce, or transmit the e-mail kept stored there, or receive an e-mail and store it there.

According to the present invention, since the OS is in sleep, it is indeed impossible to handle a large amount of data or to perform a complex calculation. However, as to the daily frequently used functions, it is possible to operate them with the OS being out of operation. Therefore, the present invention greatly enhances the convenience of using the information processing apparatus. Also, in a case where operating the apparatus with batteries, it becomes possible to avoid the useless power consumption and to operate the apparatus with batteries for a long time period.

As has been described above, according to the present invention, even when the information processing apparatus (operating system) is in the state of sleep, it is possible to immediately execute the process such as schedule display or music reproduction without restoring into the ordinary state of operation. In addition, since there is no need to restore from the state of sleep to the ordinary state of operation, the power consumption by the circuit components to which the power is supplied when the OS is in its ordinary state of operation can be suppressed. For instance, in a case where the information processing apparatus is driven by batteries, it becomes possible to increase the amount of time during which they are driven.

DESCRIPTION OF THE PREFERRED EMBODIMENTS

Hereinafter, an embodiment of the present invention will be explained.

Figure 1:
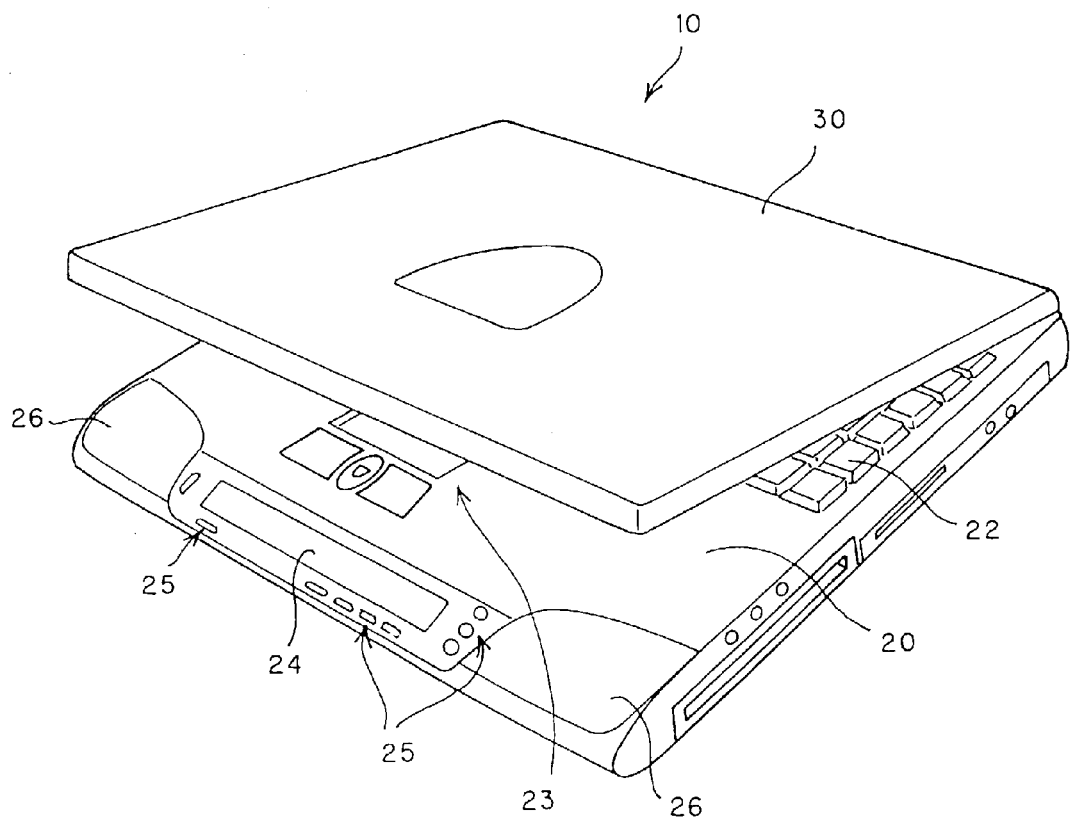
FIG. 1 is an outer appearance view of a note type personal computer.
Figure 2:
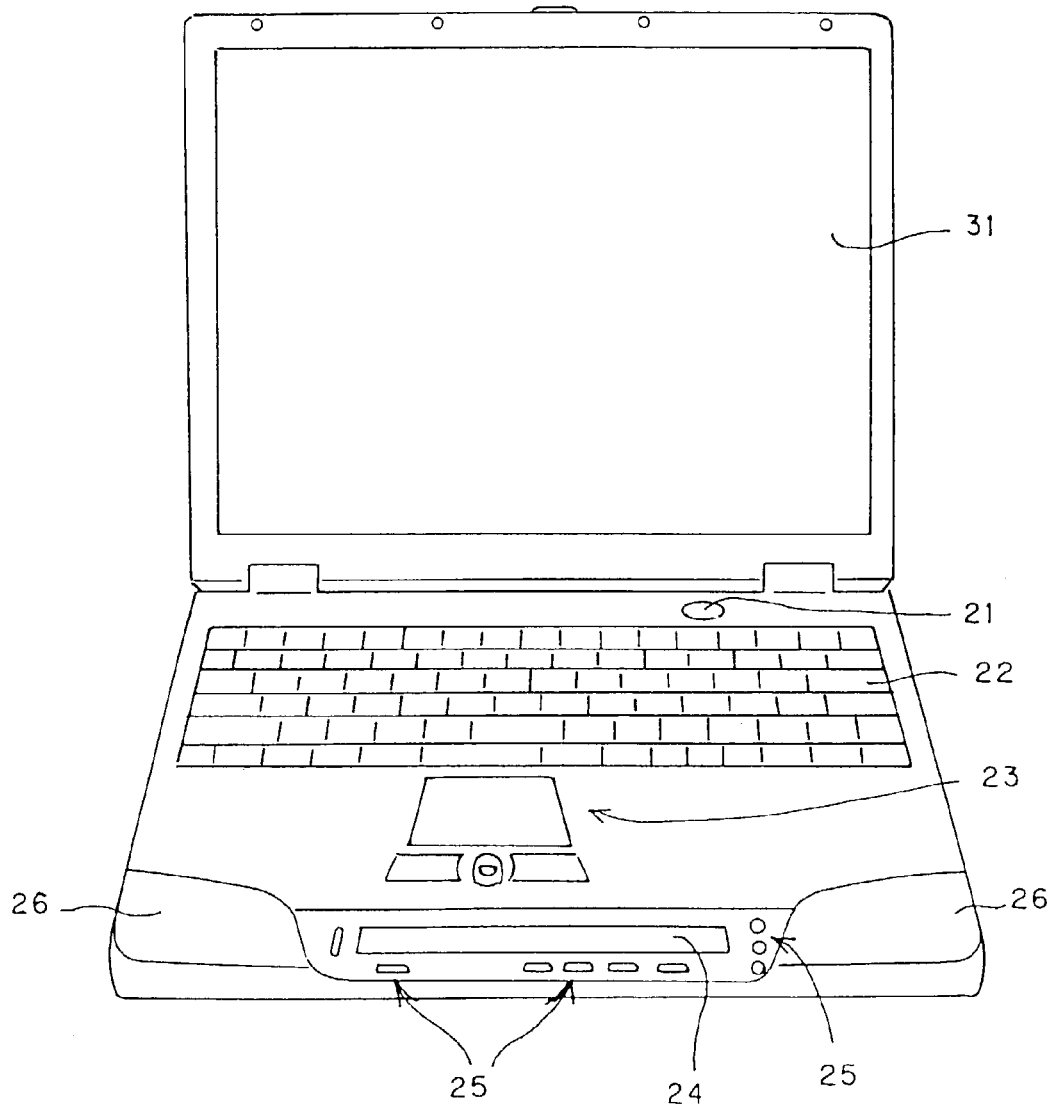
FIG. 2 is an outer appearance view of the note type personal computer.

FIGS. 1 and 2 are outer appearance views illustrating a note type personal computer (hereinafter abbreviated as "the note type PC") according to an embodiment of an information processing apparatus according to the present invention. FIG. 1 illustrates a state where a lid (the image display screen) of that note type PC is slightly opened while FIG. 2 illustrates a state of use wherein the lid is opened and the image display screen thereby is oriented approximately straightforwards with respect to the user's front.

This note type PC 10 is consisted of a main body unit 20 and a lid unit 30 openable with respect to the main body unit 20.

In the main body unit 20 there are disposed a power button (suspend/resume changeover button) 21, a keyboard 22, a pointing device 23, an auxiliary screen 24 of a size smaller than that of a main screen 31 as later described (the auxiliary screen is generally called "a status display section"), various kinds of auxiliary buttons 25, an audio section 26 having installed therein a speaker or the like. In the surface of the lid unit 30 that is located inside when the lid unit 30 is closed, there is provided the main screen 31.

Figure 3:
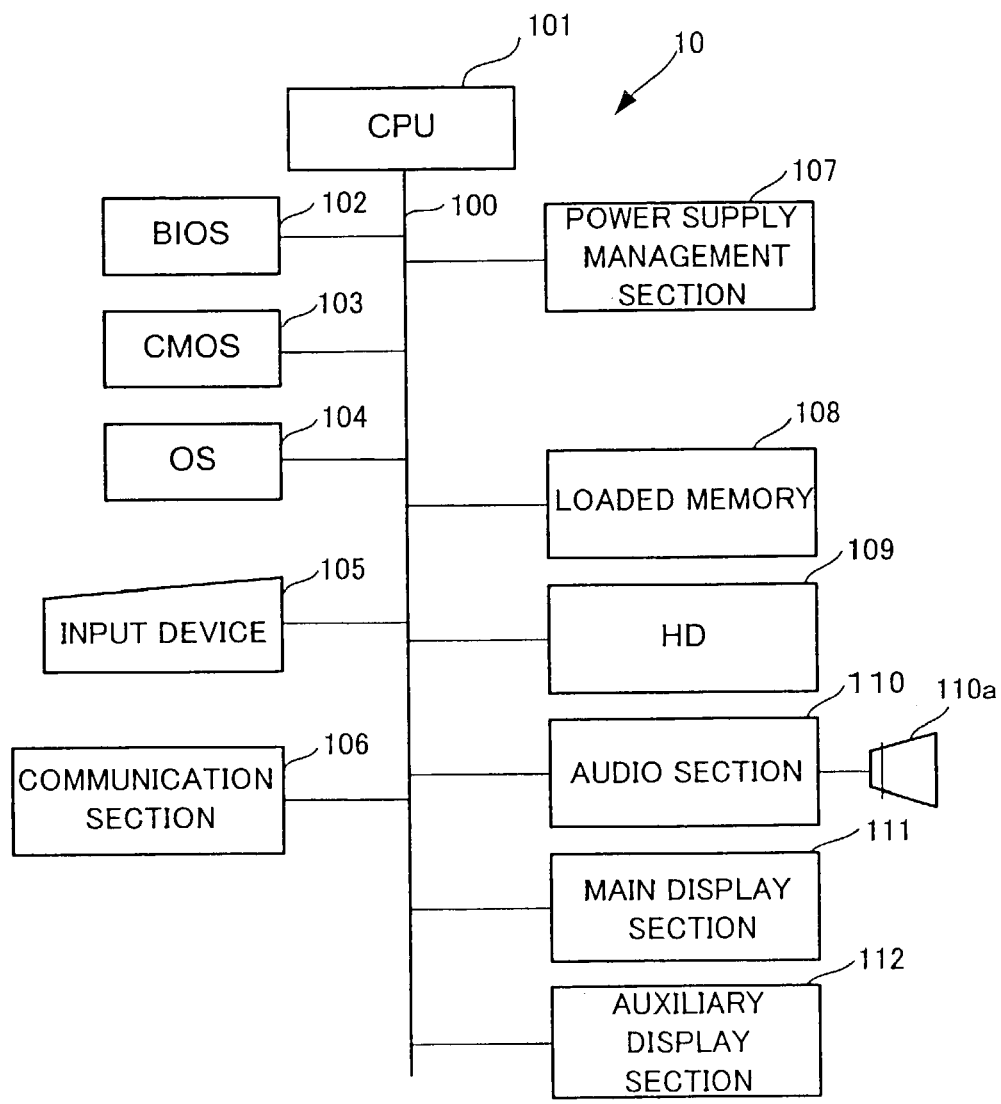
FIG. 3 is an internal structural view of the note type PC.

FIG. 3 is an internal structural view of a note type PC whose outer appearance is shown in FIGS. 1 and 2.

The note type PC 10 of FIG. 3 comprises a CPU 101 that executes various kinds of programs, a BIOS 102, a CMOS 103 that stores therein data that is used in the BIOS 102, an OS 104, an input device 105 including a keyboard 22 and auxiliary button 25, etc. illustrated in FIGS. 1 and 2, a communication section 106 that can be connected to a wireless LAN or dial-up network and can make a communication in compliance with the Bluetooth (trademark) protocol, a power source supply management section 107 that manages the supply of a power source to the respective components illustrated in FIG. 3, a loaded memory 108 that is used for the execution of the OS 104 and various kinds of application programs that are read out from a hard disk 109 as described below, the hard disk (HD) 109 that stores therein the OS 104 and various kinds of application programs, an audio section 110 for outputting information such as music in the form of voice (having connected thereto a speaker 110a), a main display section 111 that displays an image, letters or the like on the main screen 31 illustrated in FIG. 2, and an auxiliary display section 112 that displays letters or the like on the auxiliary screen 24 illustrated in FIGS. 1 and 2. These elements, devices or the like are connected by means of a bus 100.

Figure 4:
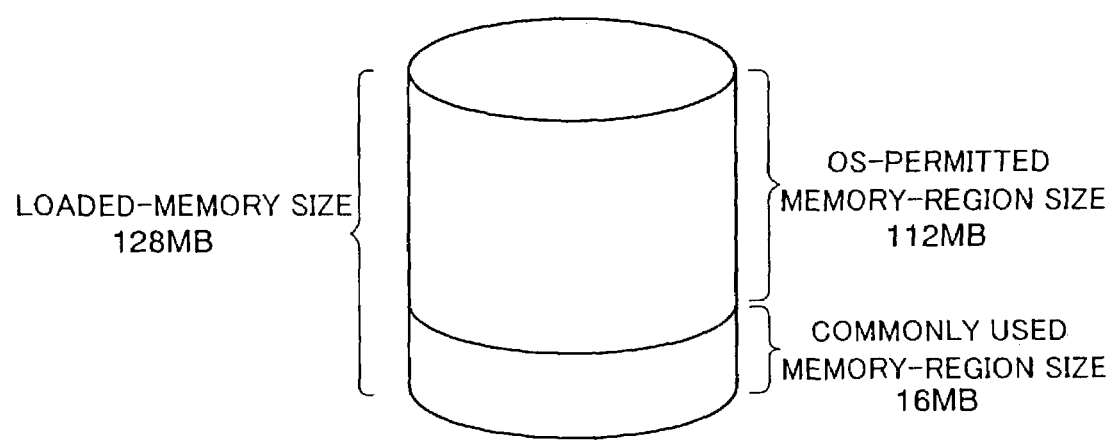
FIG. 4 is a view illustrating a memory map of the loaded memory.

FIG. 4 is a view illustrating a memory map of the loaded memory that is illustrated with one block in FIG. 3.

When pushing the power source button (suspend/resume changeover button) 21 (see FIG. 2) while this note type PC (operating system) is in the state of sleep, the power is also supplied to circuit components other than those which have had the power supplied thereto in the state of sleep by the power source supply management section 107. This restores the note type PC (operating system) into an ordinary state of operation where ordinary processes are possible.

Here, the state of sleep of the operating system in this embodiment of the present invention means the one where the power is supplied to at least the circuit components only, necessary for realizing the present invention. In this embodiment, the CPU 101, memory 108, communication section 106, audio section 110, auxiliary display section 112 or the like correspond to those circuit components. Incidentally, regarding these circuit components, also, according to the contents of the process executed, the power has only to be supplied at least only to a necessary and minimum number of such circuit components needed to execute that process. Namely, they have only to be a necessary and minimum number of circuit components. For instance, if displaying information on the auxiliary display screen, the power has only to be supplied to the necessary circuit components, only, for executing that display processing. If outputting a musical piece, the power has only to be supplied to the necessary circuit components, only, for that output processing. Whichever the contents of the process may be, supplying the power to the memory 108 is a structure that is prerequisite to carrying out the present invention.

Also, the ordinary state of operation of the operating system in this embodiment of the present invention means the one where the power is supplied also to circuit components (e.g. a hard disk, main screen or the like) other than those to which the power is supplied when the operating system is in the state of sleep. Incidentally, in the ordinary state of operation, also, it is not necessary that the power be supplied to all the circuit components and, in a case where the user selects and sets the circuit components to which the power is supplied when the operating system is in the ordinary state of operation, the power has only to be supplied to those circuit components according to those settings. However, this ordinary state of operation generally is greater in power consumption than the state of sleep.

The loaded memory 108 illustrated in FIG. 4 is a type to which the operating system can have access in its ordinary state of operation. It also is a type to which the program according to the embodiment of the present invention can access at least when the operating system is in the state of sleep.

In the CMOS 103, there are stored the size of the loaded memory 108 as a whole (the size of the loaded memory), the size of the region whose use by the OS is permitted (the size of the OS memory region), and the size of the region whose access by the OS is ordinarily prohibited (the size of the commonly used memory region).

The memory size of the OS memory region and the memory size of the commonly used memory region can be arbitrarily set by the user on the BIOS 102 so that the total sum of the both may be the size of the loaded memory (here 128 MB).

Here, when the BIOS 102 starts the OS 104, those sizes stored in the CMOS 103 are notified to the OS 104, and, as a result, the OS 104 operates using the interior of the OS memory region, only, the use of which is ordinarily permitted. At this time, only when a special declaration that the commonly used memory region be open has been made, the OS becomes able to access this commonly used memory region.

In the following description, the following examples will be explained for the purpose of showing the respects that are characteristic of the present invention. A first one of them is the one wherein schedule data is stored beforehand in the commonly used memory region portion of the memory; and this schedule data is displayed on the auxiliary screen 24 (see FIGS. 1 and 2). A second one of them is the one wherein music data is stored beforehand in the commonly used memory region portion and music is reproduced through the audio section 110 and speaker 110a illustrated in FIG. 3. A third one of them is the one wherein an e-mail the user plans to send is stored beforehand in the commonly used memory region portion and sends the email; and the user receives an e-mail and the OS stores it in the commonly used memory region portion. However, regarding items that are common to those three examples, they will be represented, according to the necessity, by the example of storing and displaying schedule data.

Figure 5:
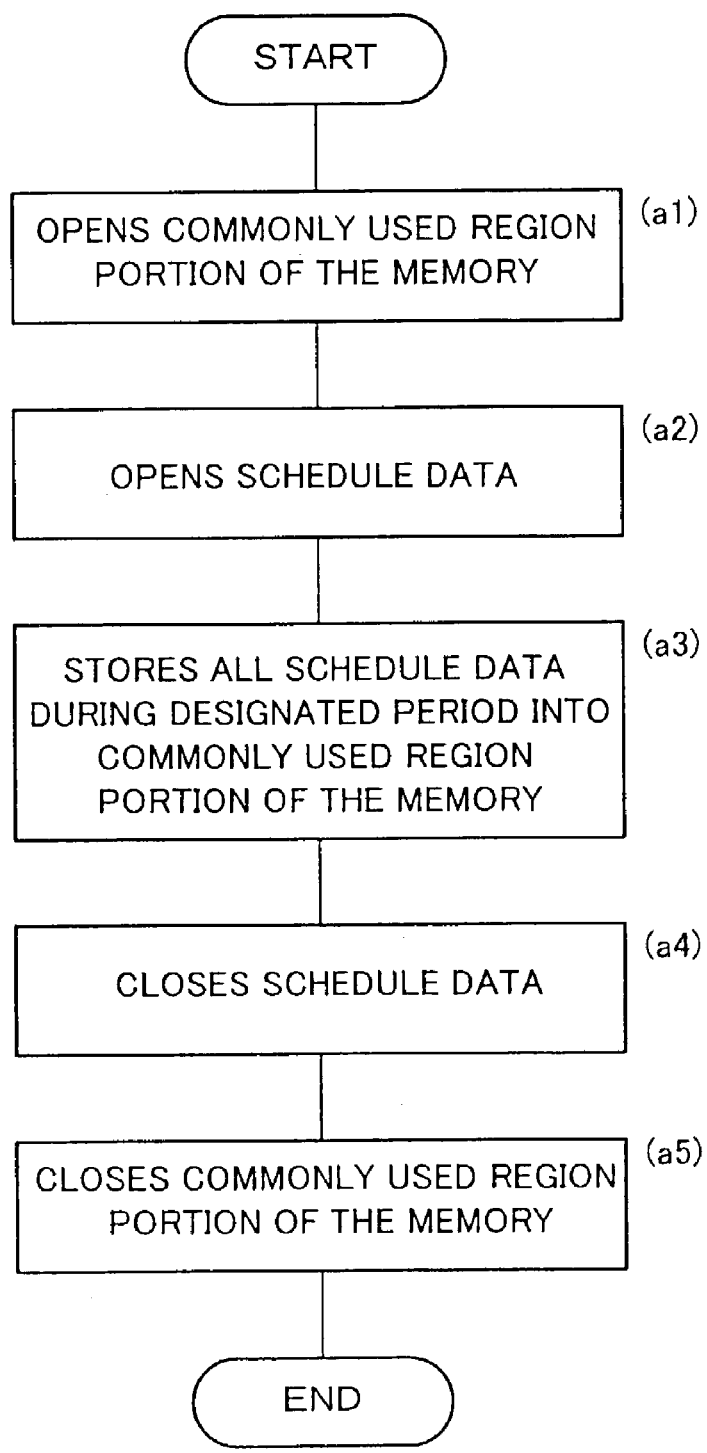
FIG. 5 is a flow chart illustrating the process that is executed when storing schedule data into a commonly used region portion of the memory.

FIG. 5 is a flow chart illustrating a process that is executed when schedule data is stored in the commonly used memory region portion of the memory.

The flow chart of FIG. 5 is executed, when the note type PC is already booted into the ordinary state of operation, according to the user's manipulation. It is to be noted that ordinarily schedule data has its full-period data stored within the hard disk (HD) 109 illustrated in FIG. 3 and that the period in which the schedule data is to be transferred onto the commonly used memory region portion of the memory is designated by the user.

According to the flow chart of FIG. 5, first, a declaration (open) that the commonly used memory region portion of the memory be accessed is made to thereby enable accessing the commonly used memory region portion (step a1). Subsequently, a declaration (open) that the schedule data within the HD 109 be accessed is made to thereby enable accessing the schedule data (step a2). In this way, after the "open" declaration has been made, all the schedule data during the designated period is read out from the HD 109 and is stored into the commonly used memory region portion of the memory (step a3). Then, a declaration to stop accessing the schedule data (close) and a declaration to stop accessing the commonly used memory region portion of the memory (close) are respectively made (steps a4 and a5).

Incidentally, in a case where music data is stored into the commonly used memory region portion of the memory, the operation only differs in that, on the flow chart of FIG. 5, music data is handled instead of the schedule data. Therefore, the explanation about storing music data into the commonly used memory region portion is omitted here.

Also, to read out data stored in the commonly used memory region portion of the memory when the OS is in its ordinary state of operation, there is executed the process of making an open declaration of that commonly used memory region portion and thereby reading out data from there and making a close declaration of the commonly used memory region portion. The read-out process in the ordinary state of operation is not a characterizing feature of the present invention and therefore a detailed explanation about that is omitted.

Figure 6:
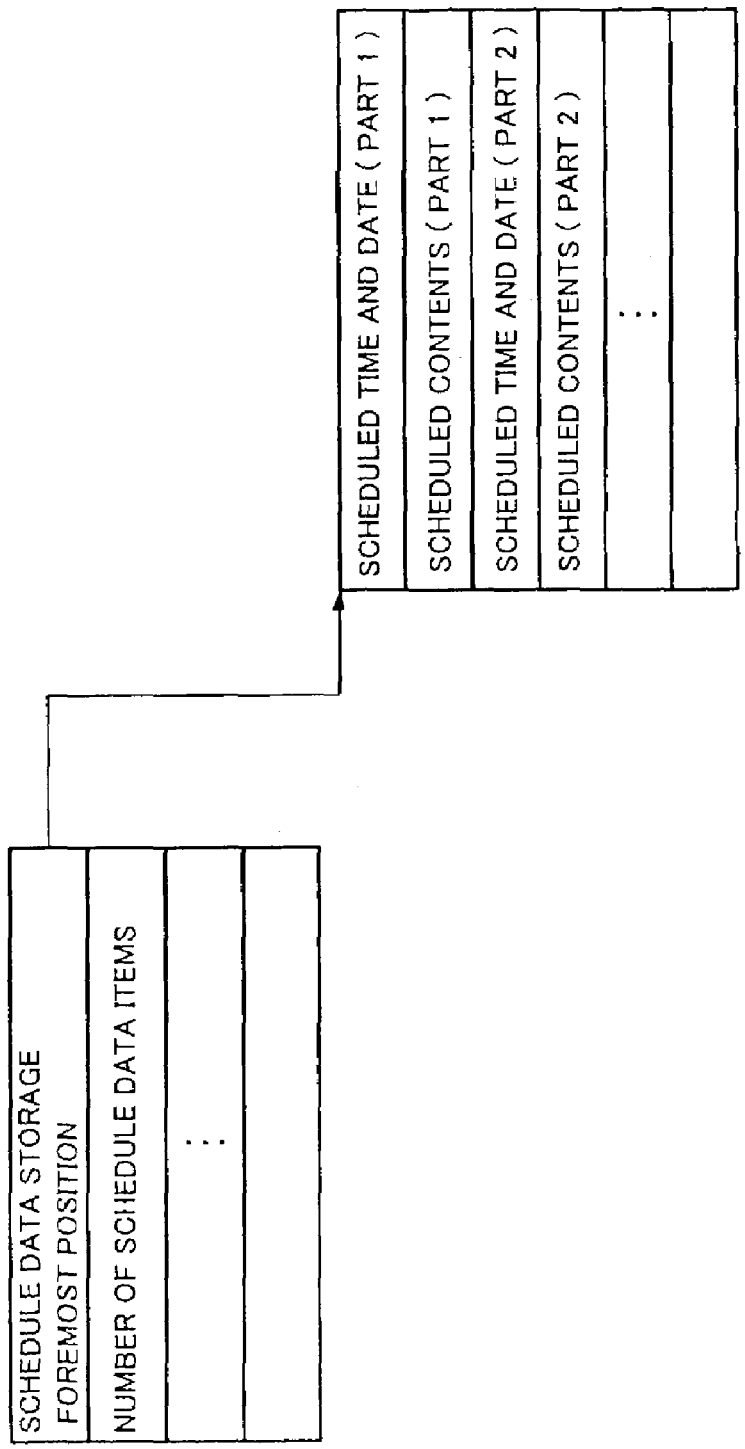
FIG. 6 is a view illustrating the data structure of data stored in the commonly used region portion of the memory.

FIG. 6 is a view illustrating a data structure of the data stored in the commonly used memory region portion of the memory.

Here, also, an explanation will be given by taking up the schedule data as an example.

In this commonly used memory region portion, first, "schedule data storage foremost position" and "number of schedule data items" are stored in the header. Subsequently to the address designated as the "schedule data storage foremost position", pairs of scheduled time and date and scheduled contents are stored by the number designated by the "number of schedule data items".

Regarding music data and e-mail, also, excepting that the amount of data corresponding to one musical piece of music data or one e-mail piece of e-mail data variously differs, the manner in which data is handled is substantially the same as in the case of the schedule data. Taking up music data as an example, for each musical piece, the "music data storage foremost position" of that one musical piece of music data and the "number of music data items" of this musical piece are stored in the header. Subsequently to the address designated as the "music data storage foremost position" of that music, the music data of that music is stored in the region whose size is designated by the "number of music data items" of that music. The same applies to e-mail, too.

Figure 7:
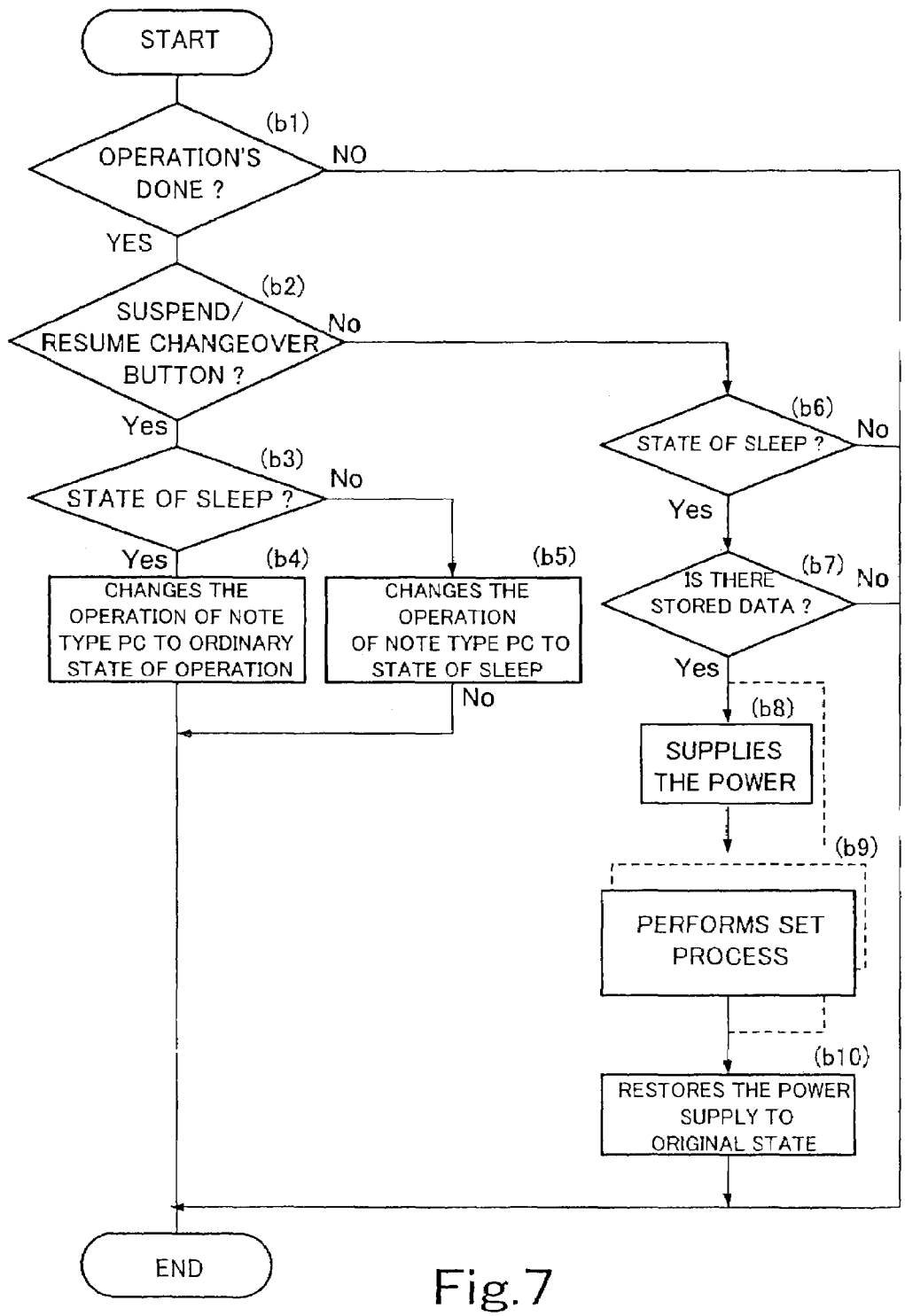
FIG. 7 is a flow chart illustrating the process that is executed when user's operation has been done.

FIG. 7 is a flow chart illustrating a process that is executed when the user's operation has been done. This process illustrated in this flow chart is the process that is executed on the BIOS and the object with respect to which this process is executed is the operation of the suspend/resume changeover button illustrated in FIG. 2 and the operation of the process changeover button that is one of the auxiliary buttons 25 illustrated in FIGS. 1 and 2.

When this process of FIG. 7 is started, first, in step b1, it is determined whether the suspend/resume changeover button or process changeover button has been operated. When any one of these buttons is not operated, e.g., when a button other than these two buttons has been operated, no processing regarding the process of FIG. 7 is executed and the process is terminated.

When one of the two buttons has been operated, the flow proceeds to step b2 in which it is determined whether the button that has been operated this time is the suspend/resume changeover button. In a case where the suspend/resume changeover button has been operated this time, the flow proceeds to step b3 in which it is determined whether the present note type PC is now in the state of sleep. When the note type PC has now been in the state of sleep, the state of that note type PC is changed to the ordinary state of operation (step b4). Conversely, when the note type PC has now been in the ordinary state of operation, the state of the note type PC is changed to the state of sleep (step b5).

On the other hand, when it is determined that the button which has been operated this time is not the power source button (suspend/resume changeover button) 21 but the process changeover button which is one of the auxiliary buttons 25, the flow proceeds to step b6 in which it is determined whether the note type PC is in the state of sleep. The auxiliary button 25 is a button which is active only when the PC is in the state of sleep, and, when the PC is not in the state of sleep now (is in the ordinary state of operation now), nothing is done and the flow is terminated.

When the PC is in sleep, the flow proceeds to step b7 in which it is determined whether there exists data stored in the commonly used memory region portion (see FIG. 4) of the memory. When there is no stored data, the flow ends as is.

When storage data is stored in the commonly used memory region portion of the memory, the flow proceeds to step b8 in which power is supplied to the necessary components.

Here, the explanation about the process of FIG. 7 is interrupted once and an explanation will be given of the operation of the process changeover button.

Figure 8:
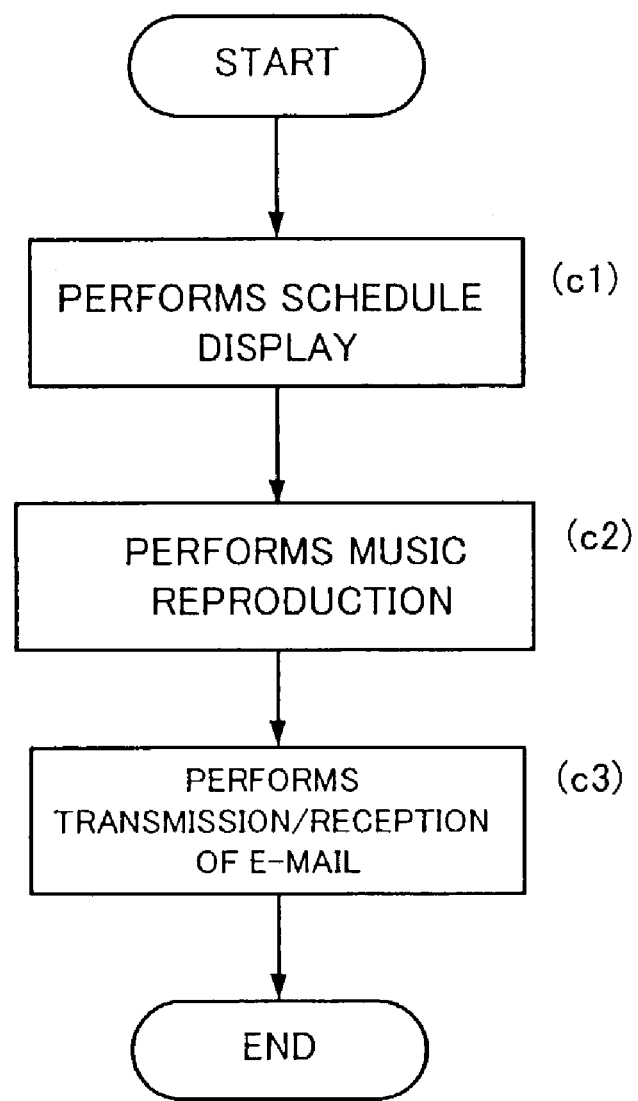
FIG. 8 is a flow chart illustrating a routine that operates interlockingly with the operation of a process changeover button.

FIG. 8 is a flow chart of a routine that operates interlockingly with the operation of the process changeover button. This routine also operates on the BIOS.

When the process changeover button is pressed once, it is set that the schedule display process should be executed (step c1); when the process changeover button is pressed once more successively, the setting for the schedule display process is released and it is set that music reproduction process should be executed (step c2); when the process changeover button is further pressed once more successively, the setting for the music reproduction process is released and it is set that the transmission/reception process of e-mail should be executed (step c3); and when the process changeover button is again further pressed once more successively, the setting for the e-mail transmission/reception process is released and the PC is returned to the state of sleep. When further pressing the process changeover button, the operation is again repeated from setting the schedule display process (step c1). When any one of the schedule display, music reproduction, and e-mail transmission/reception processes is set in the above-described way and is allowed to stay in this set state for a while, the setting for that process is established. The declaration on the performance or nonperformance of the operation of the process changeover button in the step b1 in FIG. 7 is made in the way of declaration in which, when the process is selected as above and the setting for this selected process has been established, it is determined that the operation of the process changeover button has been done.

In the step b8 of FIG. 7, the power is supplied to the components complying with the process that has been set in the above-described way.

Figure 9:
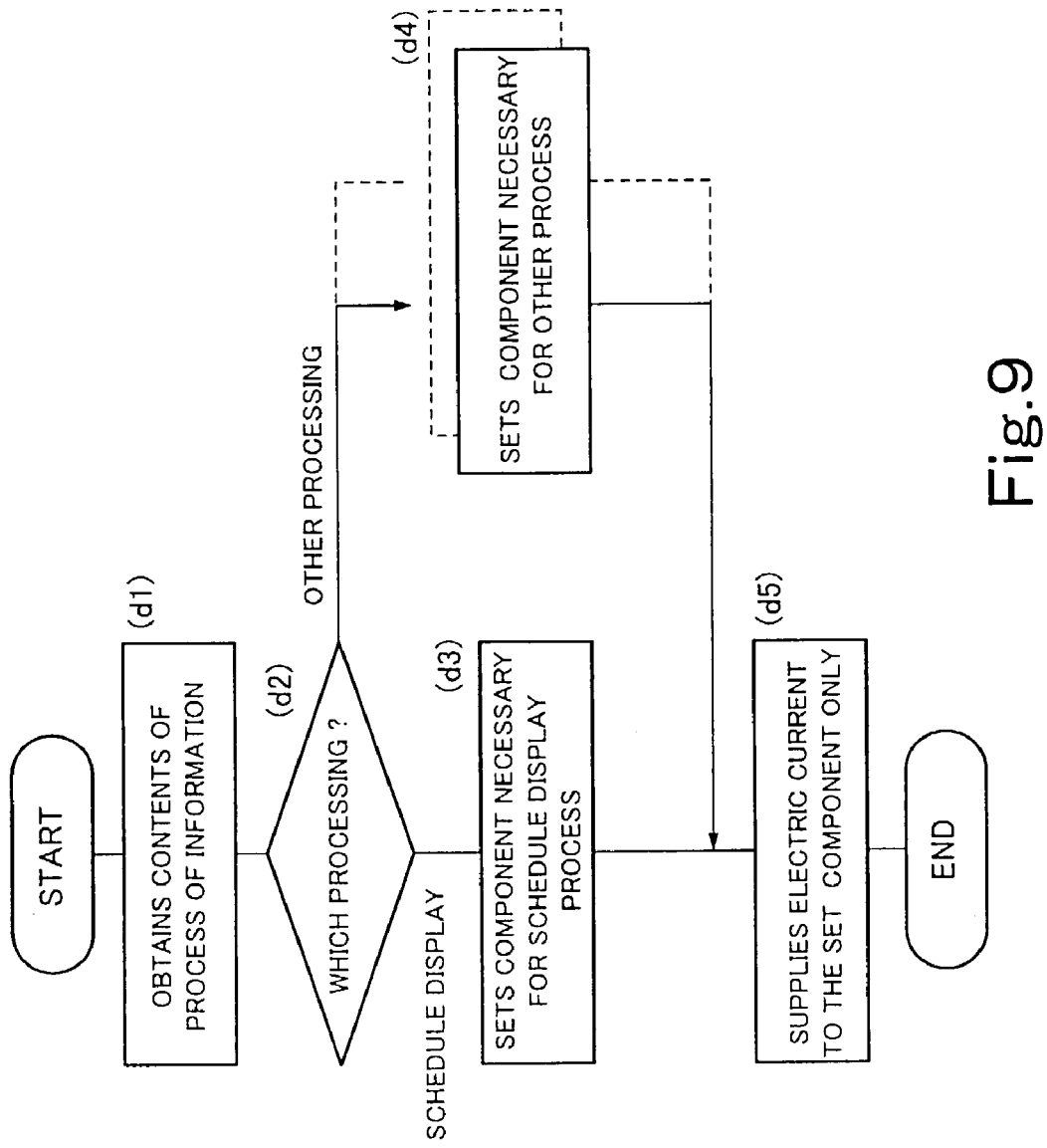
FIG. 9 is a flow chart illustrating the process for supplying a power source in step b8 in FIG. 7.

FIG. 9 is a flow chart illustrating the process of supplying the power source in the step b8 of FIG. 7. Here, the explanation will be given by taking up the schedule display process similar to that which has heretofore been described for illustration, as an example.

Here, first, the contents of the process of the information, namely, the contents of the process set by operating the process changeover button in the above-described way are obtained (step d1), and it is determined whether the process that should be executed this time is the schedule display process or another process (music reproduction process or e-mail transmission/reception process) (step d2).

When the process that should be executed this time is the schedule display process, the flow proceeds to step d3 in which the components necessary for executing the schedule display process are set in the power source supply management section 107 illustrated in FIG. 3. Then, in step d5, the power is supplied to only those components set by the power source supply management section 107.

Regarding the process (music reproduction process or e-mail transmission/reception process) other than the schedule display process, also, setting of the necessary components for that process is performed (step d4), thereby the power is supplied to only the components that have been set (step d5).

When in the step b8 of FIG. 7 the power is supplied to only the necessary components in the above-described way, then in the next step b9 there is executed the process that has been set by operating the process changeover button.

Figure 10:
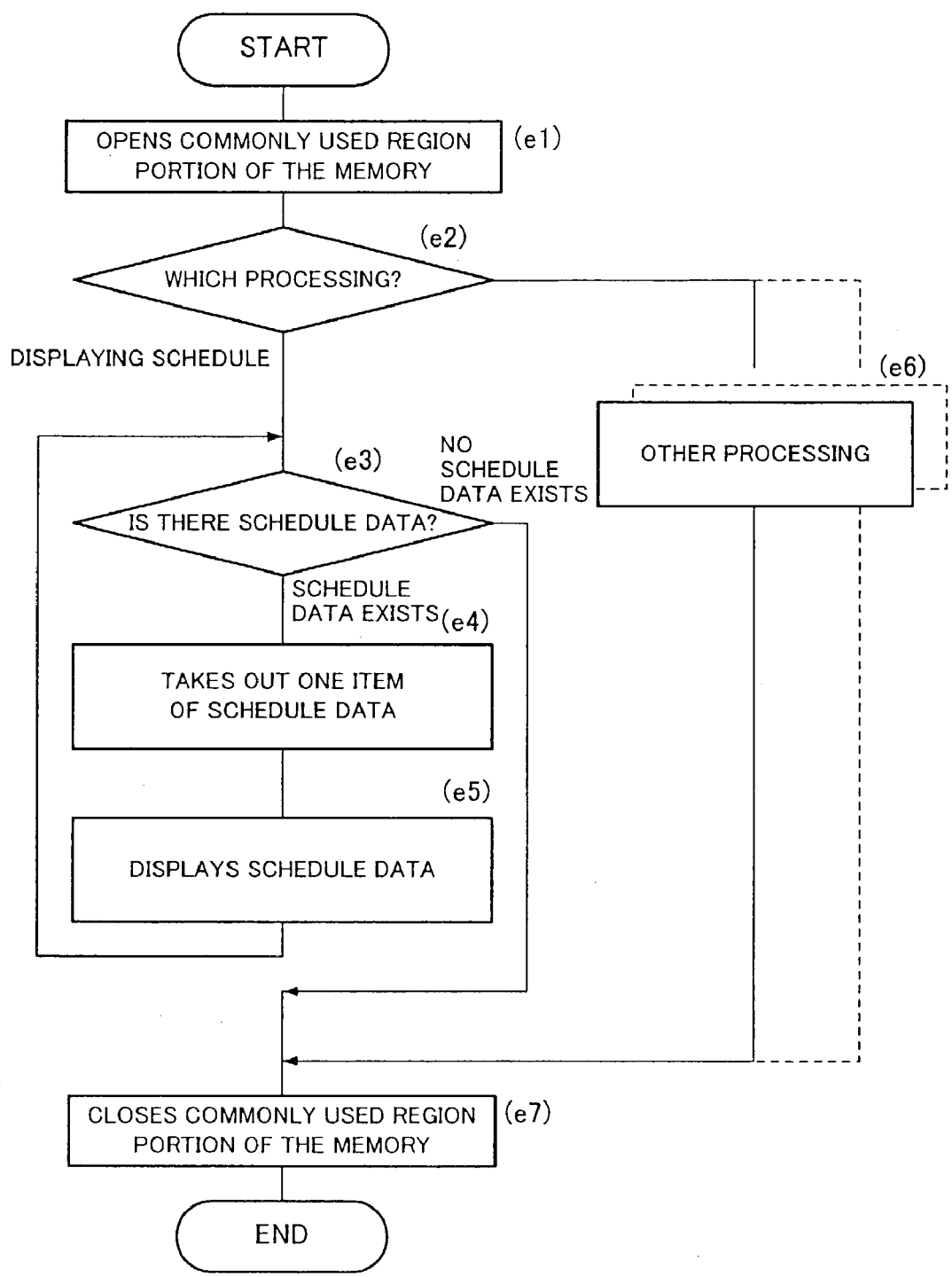
FIG. 10 is a flow chart illustrating the process executed in step b9 in FIG. 7.

FIG. 10 is a flow chart illustrating the process of the step b9 in FIG. 7. Here, also, the explanation will be given according mainly to the schedule display process.

Here, first, an "open" declaration of that the commonly used memory region portion of the memory be open is made (step e1), and it is determined which process should be executed (step e2).

When it is determined that the schedule display process should be executed, it is determined whether schedule data exists within the commonly used memory region portion (step e3). When that data exists, one item of schedule data within the commonly used memory region portion is taken out (step e4) and this item of schedule data is displayed on the auxiliary screen 24 (see FIGS. 1 and 2) (step e5).

Figure 11:
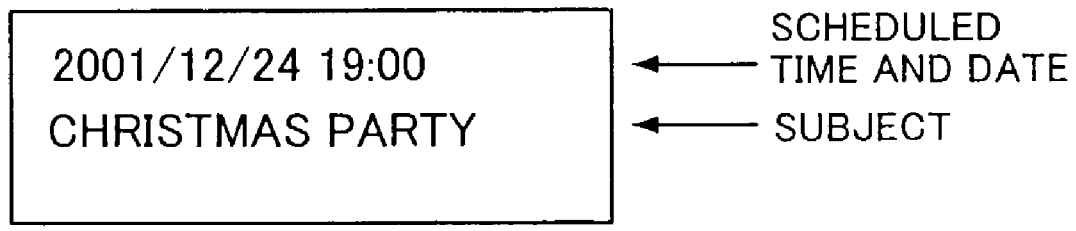
FIG. 11 is a view illustrating an example of display of the schedule data.

FIG. 11 is a view illustrating a display example of the schedule data.

On this screen, there are displayed "2001 Dec. 24 19:00" which is the "scheduled time and date" about one item of schedule and "Christmas Party" which is the subject of that schedule.

The explanation goes on by turning back to FIG. 10.

When pressing the forward-feed button which is one of the auxiliary buttons 25 illustrated in FIGS. 1 and 2, the flow returns to step e3 in which it is determined whether the schedule data that is not displayed yet exists. When that exists, there is executed the same display processing as that which was described above. When the not yet displayed schedule data has ceased to exist in the commonly used memory region portion of the memory, or when, even in the course of the process, a termination button which is one of the auxiliary buttons 25 has been pressed, the flow proceeds to step e7. In this step e7, a "close" declaration of that the commonly used memory region portion should be closed is made, thereby the schedule display process is terminated.

When it has been determined in step e2 that the process (music reproduction process or e-mail transmission/reception process) other than the schedule display process should be executed, the process that complies with that declaration is executed (step e6). And, finally, a "close" declaration of that the commonly used memory region portion of the memory should be closed is performed (step e7).

In the step b12 of FIG. 7, the power source is returned to its original state, i.e., an ordinary state as the state of sleep before the power is supplied to the necessary comopnents in the step b8.

Figure 12:
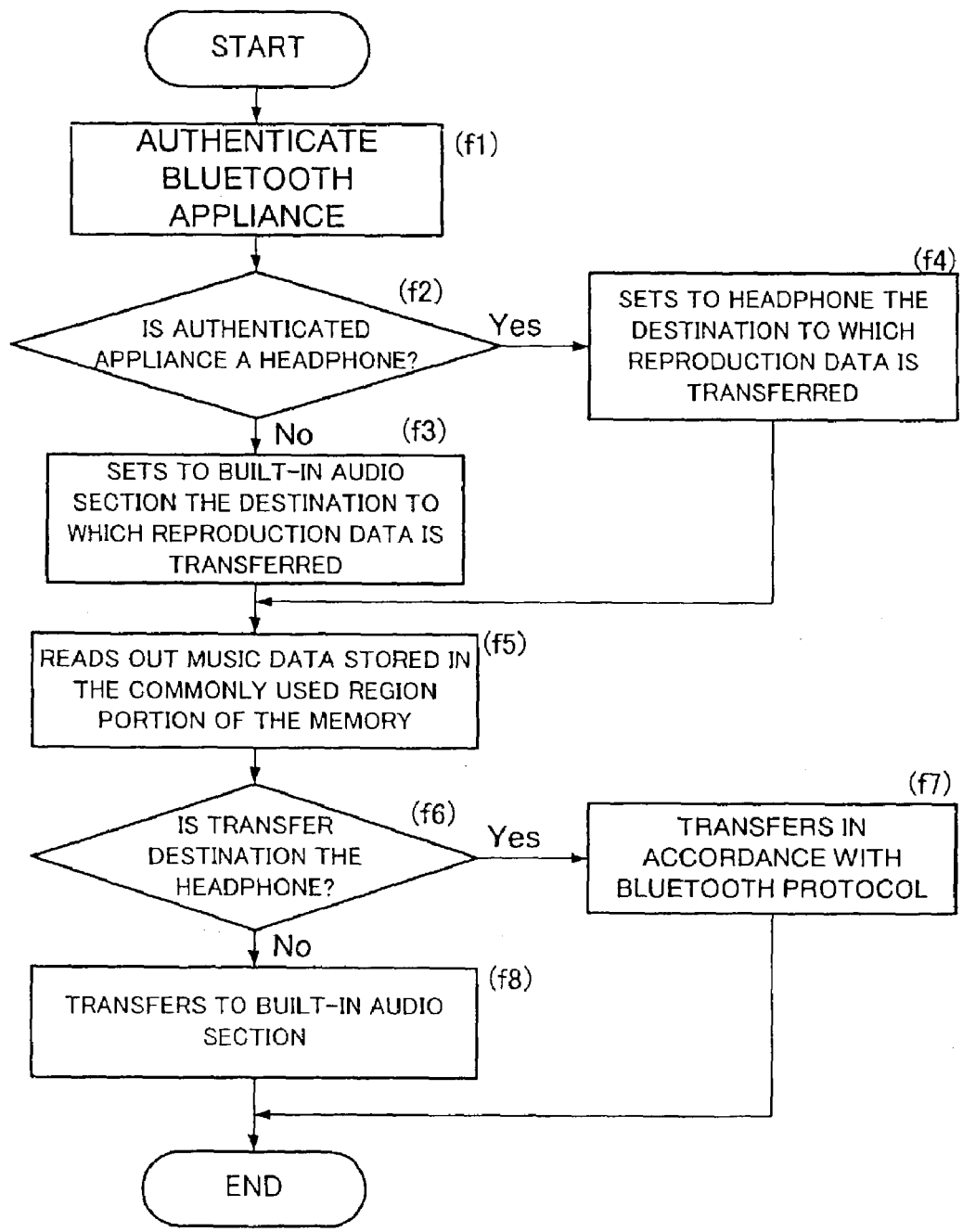
FIG. 12 is a flow chart illustrating a music reproduction process.

FIG. 12 is a flow chart of the music reproduction process. This music reproduction process of FIG. 12 is the one that is executed in step e6 of FIG. 10 when it has been determined in the step e2 of FIG. 10 that the music reproduction process should be executed.

Here, the process is executed wherein, when a headphone for performing a communication in accordance with the protocol of the Bluetooth (trademark) exists in the neighborhood of this note type PC, music data is transmitted to this headphone and reproduced; and, when such headphone does not exist in that neighborhood, music reproduction is performed by the audio section 110 (see FIG. 3) built in the note type PC.

Here, authentication processing is executed with respect to the appliance (called here "the Bluetooth appliance") communicating in accordance with the protocol of the Bluetooth which exists near this note type PC (step f1), whereby it is determined whether the authenticated Bluetooth appliance is a headphone (step f2).

When no such headphone exists near the PC, the destination to which music reproduction data stored in the commonly used memory region portion of the memory is to be transferred is set to the built-in audio section (step f3). When a headphone is authenticated, the destination to which that data is transferred is set to that headphone (step f4). Subsequently, the music data stored in the commonly used memory region portion is read out (step f5). Then, according to whether the set destination for transfer is a headphone (step f6), when the headphone is set as the transfer destination, the music data is transferred toward that headphone in accordance with the protocol of the Bluetooth (step f7), and, when the built-in audio section is set as the transfer destination, the music data is transferred to that audio section (step f8). In the destination of transfer (the headphone or built-in audio section), it receives the music data that has been transferred on and, according to the music data it has received, the music is reproduced.

Figure 13:
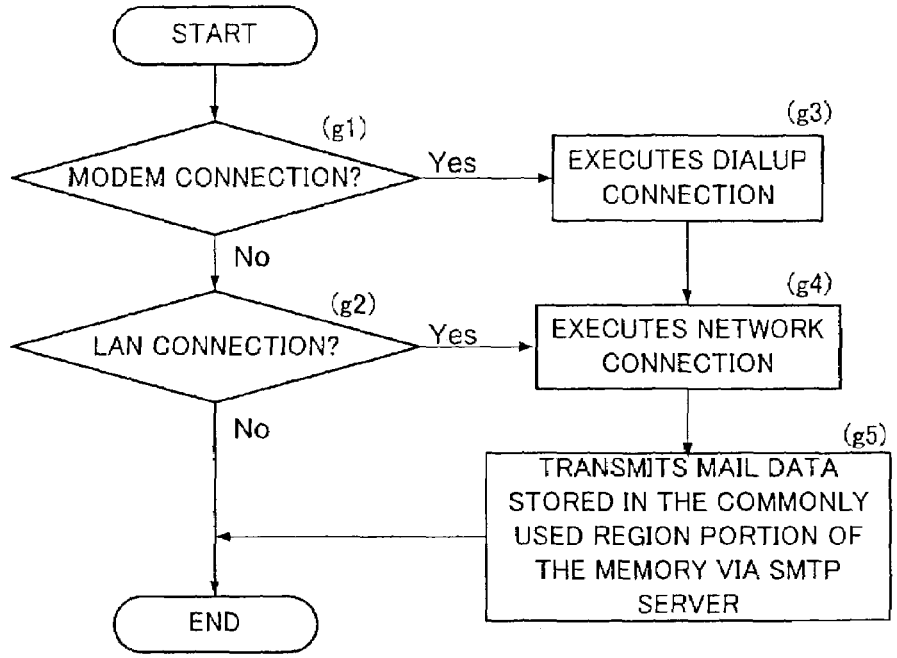
FIG. 13 is a flow chart illustrating an e-mail transmission process.
Figure 14:
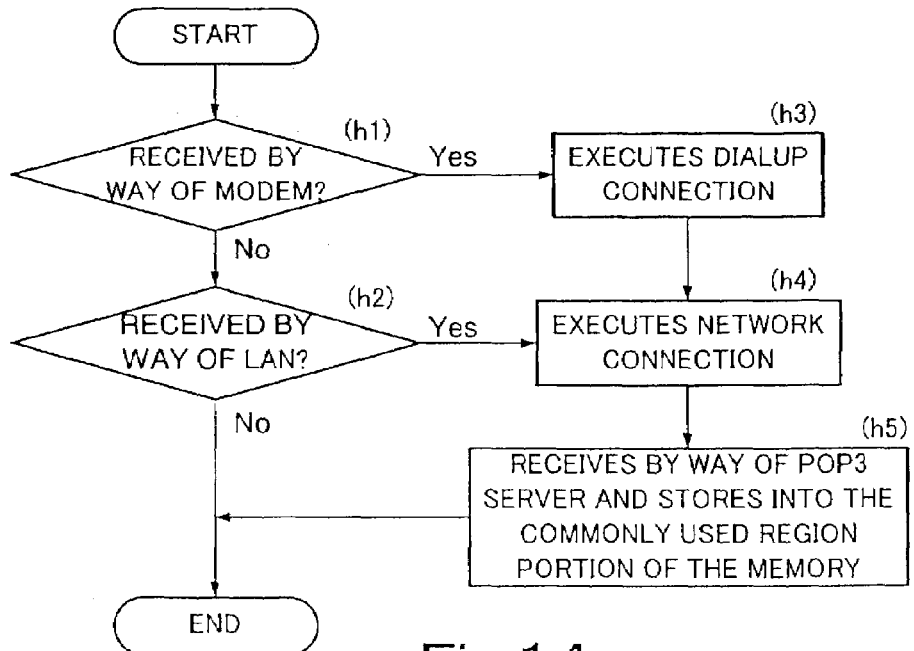
FIG. 14 is a flow chart illustrating an e-mail reception process.

FIGS. 13 and 14 are flow charts illustrating the e-mail transmission process and e-mail reception process, respectively. These processes of FIGS. 13 and 14 are the ones that are executed in the step e6 of FIG. 10 when it has been determined in the step e2 of FIG. 10 that the e-mail transmission/reception processes should be executed.

In the e-mail transmission process of FIG. 13, it is determined whether a modem connection is made (step g1) and whether a LAN connection is made (step g2). When modem connection is made, a dialup connection is executed (step g3) and when LAN connection is made, a network connection is executed (step g4). When an error occurs during the dialup connection or network connection, transmission interruption processing is executed.

When the dialup connection or network connection is established, the e-mail data stored in the commonly used memory region portion of the memory is transmitted via an SMTP (Simple Mail Transfer Protocol) server.

Also, in the e-mail reception process of FIG. 14, it is determined whether reception processing by modem is executed (step h1) and whether reception processing by LAN is executed (step h2). When reception processing by modem is executed, the dialup connection is executed (step h3) and, when reception processing by LAN is executed, the network connection is executed (step h4). When an error occurs during the dialup connection or network connection, the reception process is interrupted.

When dialup connection or network connection is established, e-mail is received via the POP3 (Post Office Protocol-Version 3) server and this e-mail data is stored in the commonly used memory region portion of the memory (step h5).

Figure 15:
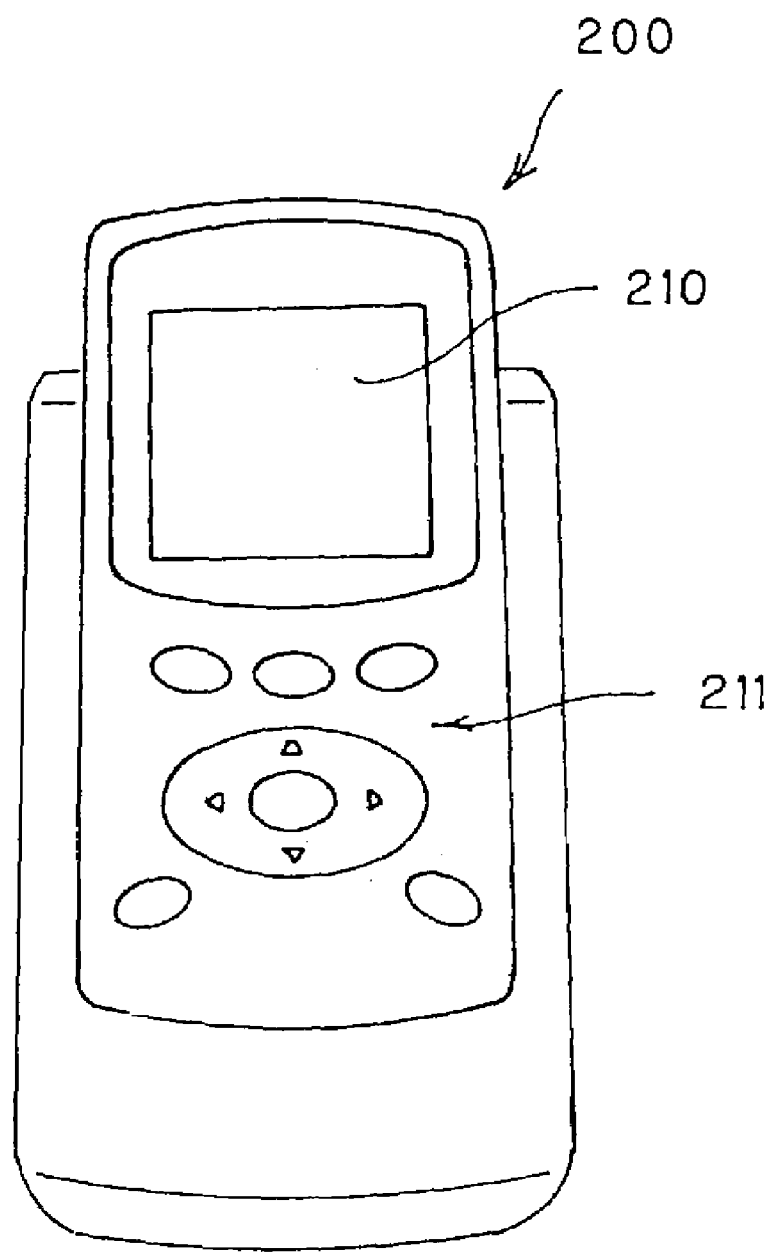
FIG. 15 is an outer appearance view of a remote controller.

FIG. 15 is an outer appearance view of a remote controller.

This remote controller 200 is equipped with an auxiliary screen 210 and auxiliary buttons 211. Between this remote controller and the note type PC, a communication in accordance with the Bluetooth protocol is performed. The auxiliary screen 210 and auxiliary buttons 211 of the remote controller 200 play the same role as that which is played by the auxiliary screen 24 and auxiliary buttons 25 illustrated in FIGS. 1 and 2. Namely, the schedule, for example, that is displayed on the auxiliary screen 24 of the note type PC is also displayed, at the same time, on the auxiliary screen 210 of the remote controller 200. On the other hand, when operating the auxiliary button 211 of the remote controller 200, the same processing as that which is executed when operating the auxiliary button 25 of the note type PC 10 is executed.

Figure 16:
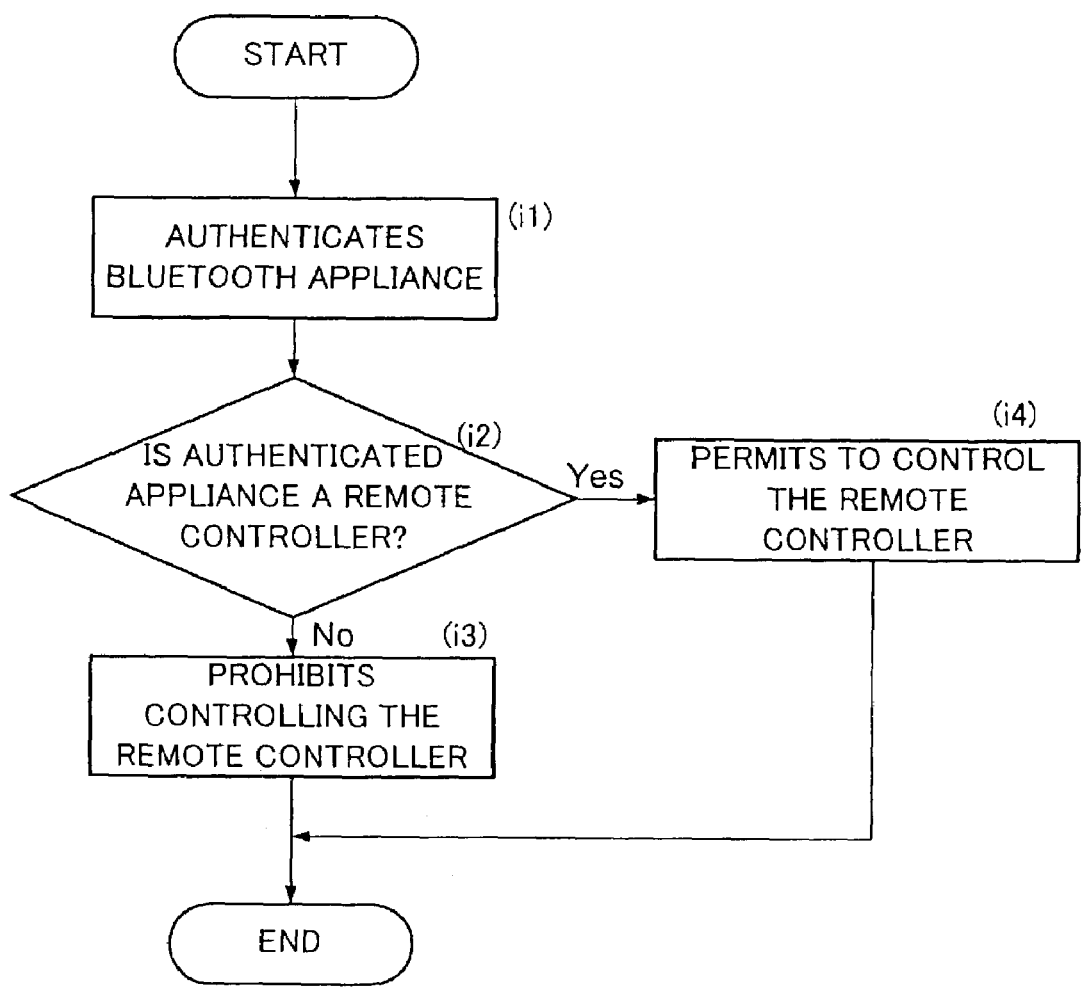
FIG. 16 is a flow chart illustrating the process for connecting the remote controller of FIG. 15 to a relevant note type PC.

FIG. 16 is a flow chart representing the process for connecting the remote controller of FIG. 15 to the note type PC. This process is periodically executed even when the note type PC is in the state of sleep.

First, in step i1, authentication processing is executed with respect to the Bluetooth appliance existing in the neighborhood of the note type PC. Namely, when the authenticated appliance has been the remote controller (remote controller) (step i2), control with respect to the remote controller is permitted (step i4). When no appliances have been authenticated or when, even when authenticated, that appliance has not been the remote controller, control with respect to the remote controller is stopped (step i3).

When control with respect to the remote controller is permitted, as stated before the information that has been displayed on the auxiliary screen of the note type PC is also displayed on the auxiliary screen 210 of the remote controller 200 as is. Namely, the operation of the auxiliary button 211 of the remote controller 200 is identified with the operation of the auxiliary button 25 on the note type PC. If equipped with this type of remote controller, confirmation of the schedule becomes easier.

What is claimed is:

1. An information processing apparatus executing an operating system having an ordinary state of operation and a state of sleep, comprising:
    a memory onto which the operating system is loaded when the operating system is in the ordinary state of operation; and
    an information processing section that, when the operating system is in the state of sleep, executes a prescribed process by using information that is stored in the memory when the operating system is in the ordinary state of operation, the prescribed process being executed outside of any operating system.

2. An information processing apparatus according to claim 1, wherein the information processing section uses as a storing region for the information a region that is partially set on the memory and that is protected from the operation of the operating system.

3. An information processing apparatus according to claim 1, further comprising an information accessing section that has a movable section and that, when the operating system is in the ordinary state of operation, causes an operating of the movable section to thereby gain access to the information, wherein
the information processing section operates when the operation of the information accessing section is being stopped.

4. An information processing apparatus according to claim 1, further comprising a plurality of components the supply of an electric current to which is stopped when the operating system is in the state of sleep and the operation of the information processing section is stopped,
wherein the information processing section operates in a state where the power source is supplied to only the components necessary for the operation which are among the plurality of components.

5. An information processing apparatus according to claim 1, further comprising an information display section that displays information,
wherein the information processing section operates when the operating system is in the state of sleep to thereby display information on the information display section.

6. An information processing apparatus according to claim 5, wherein the information display section has a main display section that has a display screen having a relatively large region and displays information on this display screen and an auxiliary display section that has a display screen having a relatively small region and displays information on this display screen,
the information processing section causes a displaying of information on the auxiliary display section.

7. An information processing apparatus according to claim 1, further comprising an information reproduction section that reproduces information,
wherein the information processing section operates when the operating system is in the state of sleep to thereby cause the information reproduction section to reproduce information.

8. An information processing apparatus according to claim 7, wherein the information reproduction section is an audio section that reproduces information as voice.

9. An information processing apparatus according to claim 1, further comprising an information communication section that communicates information,
wherein the information processing section operates when the operating system is in the state of sleep to thereby cause the information communication section to communicate information.

10. An information processing apparatus according to claim 9, wherein the information communication section performs communications of e-mail.

11. An information processing apparatus according to claim 1, wherein the prescribed process is executed by a BIOS.

12. An information processing program storage medium having recorded therein an information processing program that is executed in an information processing apparatus having operated therein an operating system having an ordinary state of operation and a state of sleep and being equipped with a memory onto which the operating system is loaded when the operating system is in the ordinary state of operation,
wherein the information processing program, when the operating system is in the state of sleep, causes the information processing apparatus to execute a prescribed process by using information that is stored in the memory when the operating system is in the ordinary state of operation, the prescribed process being executed outside of any operating system.

13. An information processing program storage medium according to claim 12, wherein the information processing program sets a part of the memory as a region that is protected from the operation of the operating system performed when the operating system is in the ordinary state of operation, and uses the partial memory as a storing region for the information.

14. An information processing program storage medium according to claim 12, wherein the information processing program has a plurality of components that, when the operating system is in the state of sleep and the operation of an information processing section that executes a prescribed process when the operating system is in the state of sleep is being stopped, have a power source stopped from being supplied thereto; and the information processing program causes the information processing section to operate in a state where an electric current is being supplied to only the necessary components for the operation which are among the plurality of components.

15. An information processing program storage medium according to claim 12, wherein the information processing apparatus has an information display section that displays information; and the information processing program operates when the operating system is in the state of sleep to thereby cause the information display section to display information.

16. An information processing program storage medium according to claim 12, wherein the information processing apparatus has an information reproduction section that reproduces information; and the information processing program operates when the operating system is in the state of sleep to thereby cause the information reproduction section to reproduce information.

17. An information processing program storage medium according to claim 12, wherein the information processing apparatus has an information communication section that communicates information; and the information processing program operates when the operating system is in the state of sleep to thereby cause the information communication section to communicate information.

18. An information processing program storage medium according to claim 13, wherein the prescribed process is executed by a BIOS.

19. An information processing apparatus including an operating system having an active state and a sleep state, comprising:
a processor; and
a memory divided into a first region accessed by said processor, and onto which the operating system is loaded, when operating in said active state, and a second region accessed by said processor when the operating system is operated in said sleep state, the accessing by said processor performed outside of any operating system.

20. An information processing apparatus according to claim 19, wherein the accessing is performed by a BIOS.

* * * * *